June 11, 1968 A. K. GRIMSLEY ET AL 3,388,017
TUBE MAKING METHOD AND APPARATUS
Filed Dec. 18, 1963 3 Sheets-Sheet 2
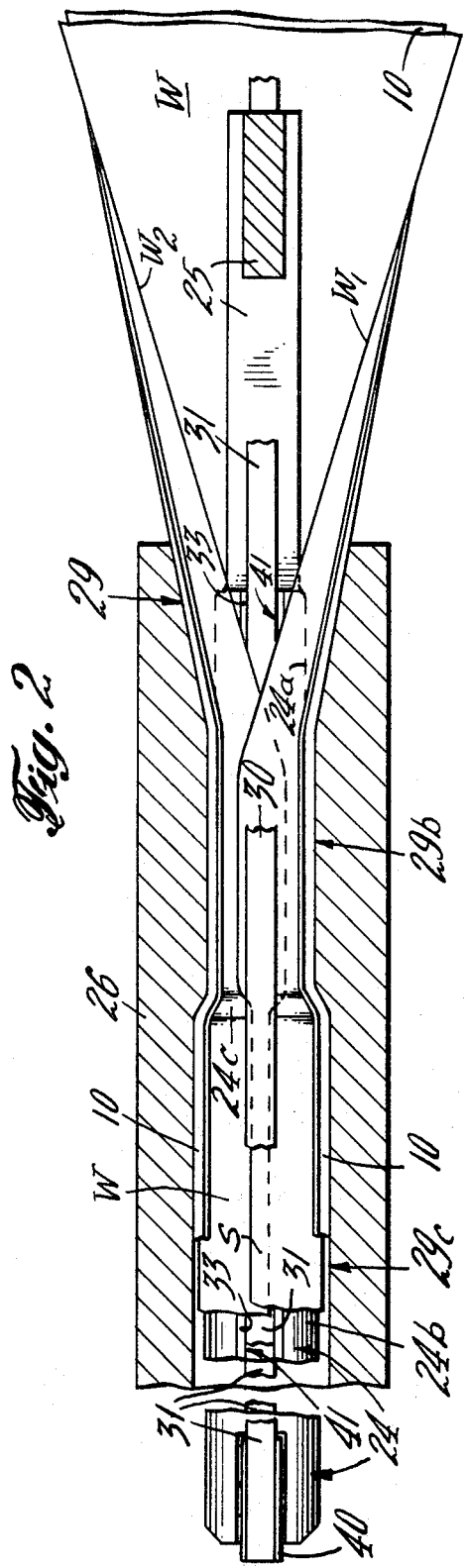
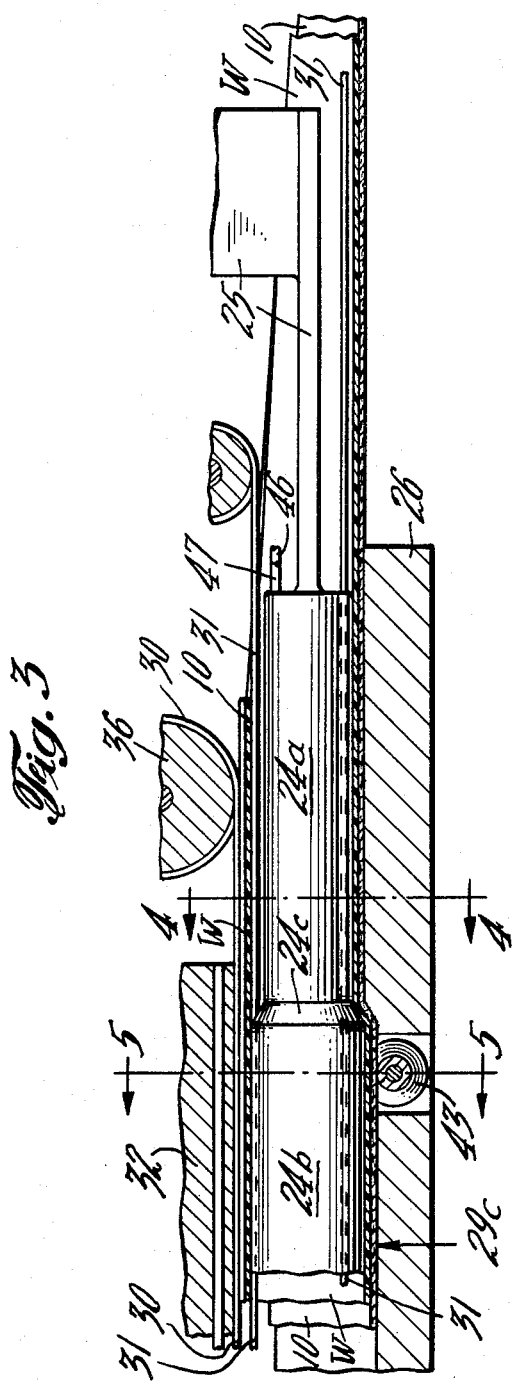
INVENTORS
ARVID KJELLSEN GRIMSLEY
CHRISTIAN THEODORE SCHEINDEL
BY Louis F. Heeb
ATTORNEY

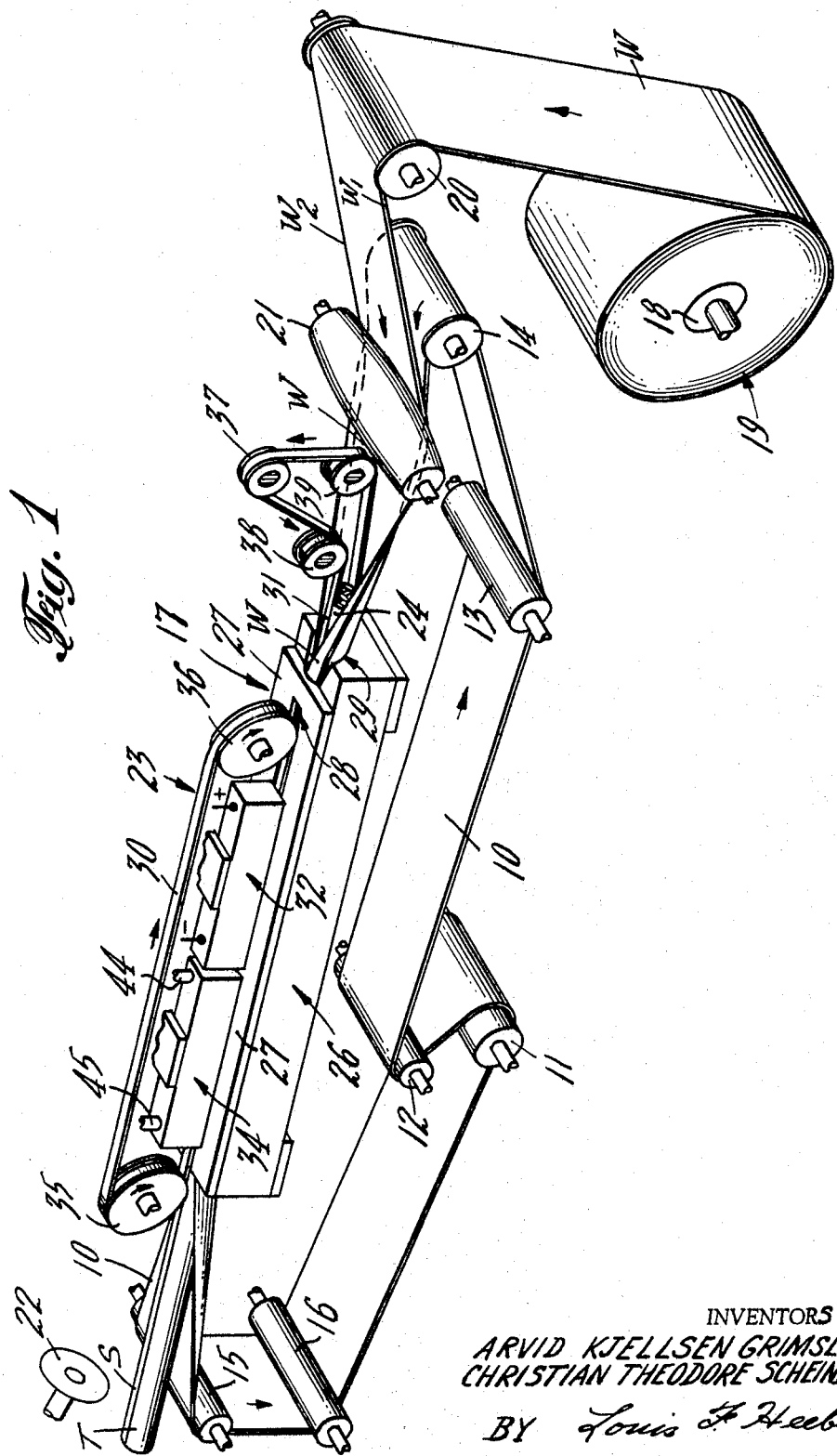

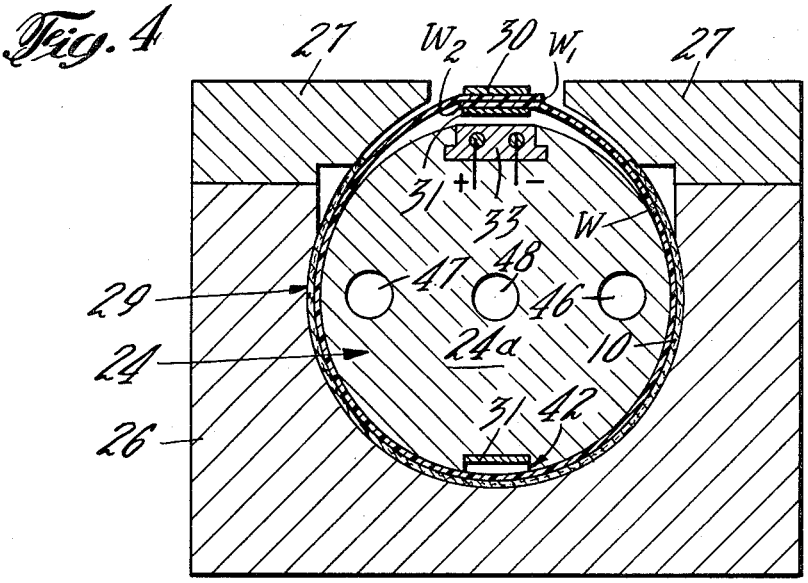
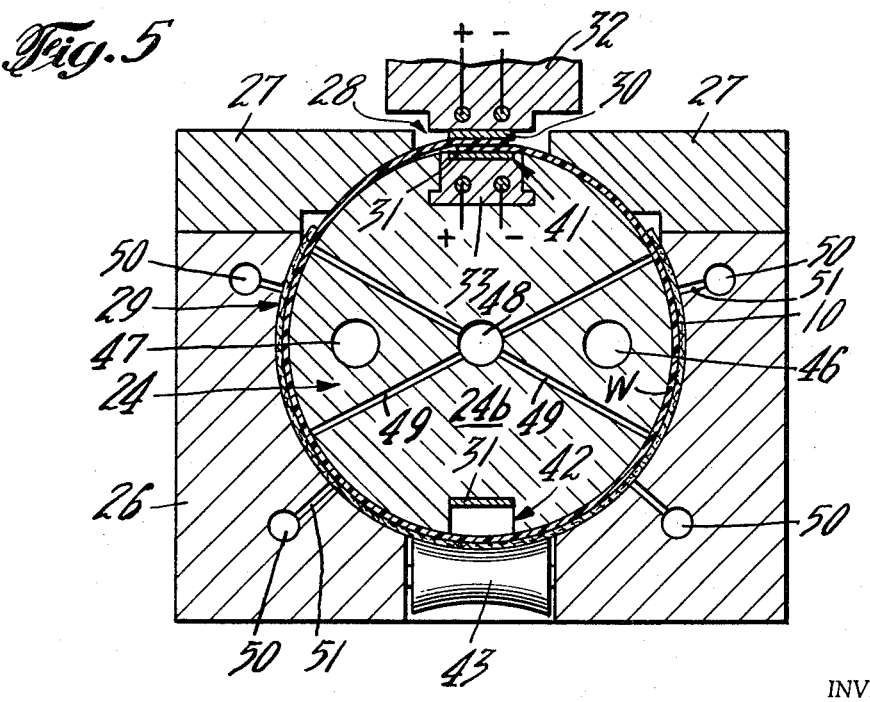

United States Patent Office 3,388,017
Patented June 11, 1968

3,388,017
TUBE MAKING METHOD AND APPARATUS
Arvid Kjellsen Grimsley, Rockaway, and Christian Theodore Scheindel, Glen Gardner, N.J., assignors to American Can Company, New York, N.Y., a corporation of New Jersey
Filed Dec. 18, 1963, Ser. No. 331,408
11 Claims. (Cl. 156—203)

This invention relates to the manufacture of tubing, and more particularly to the forming of tubing continuously from a continuous web of heat-fusible material, such as plastic or a laminate of plastic, metallic foil, etc. This invention is directed primarily to forming longitudinally seamed tubing which is to be cut into body-size lengths used in the manufacture of collapsible tube containers.

Plastic tubing for making collapsible container bodies can be manufactured in a number of ways. One of the most economical ways is to form the tubing by continuous extrusion, and this is the technique ordinarily practiced where the tube body is made entirely of plastic, e.g., polyethylene, polyvinyl chloride, etc. Another technique is to form the tubing from a supply of flat web stock by progressively folding the web around a forming horn or mandrel and seaming its edges together. This latter technique has particular utility and advantages in the making of container bodies of laminated construction comprising one or more plies of a thermoplastic material and one or more layers of a barrier material, such as metallic foil. This enables the use of a wide range of plastic films having special physical and chemical characteristics, and also permits greater versatility in certain of the important secondary operations of collapsible tube body manufacture. For example, pre-printing of the flat body stock, either on the barrier layer or on one of the plastic films, enables greater versatility and selection in decorative artwork and ordinarily is faster and therefore more economical than printing on the preformed tubular bodies.

A primary object of the present invention is to provide a method of an apparatus for making collapsible tube bodies of laminated construction from continuous flat web stock.

Another object of this invention is the provision of a method of and apparatus for forming tubing continuously from a web of flat heat-fusible material wherein the longitudinal edges of the web are progressively folded together and fused into a continuous seam.

A further object of this invention is the provision of a method of and apparatus for progressively forming a continuous web of heat-fusible material about a mandrel, accurately sizing the formed web and fusing its contiguous edges into a continuous seam.

A still further object of this invention is the provision of a method of and apparatus for forming continuously from a flat web stock accurately sized collapsible tube bodies having lapped and fused side seams.

Numerous other objects and advantages of this invention will become apparent from the following description which, taken in connection with the accompanying drawings and appended claims, particularly sets forth the various novel features of the invention in a preferred embodiment thereof.

Referring to the drawings:

FIGURE 1 is a perspective view of one form of machine, with parts broken away, for practicing our invention.

FIGURE 2 is a top plan view of a portion of the machine illustrated in FIGURE 1, partially shown in section.

FIGURE 3 is a fragmentary longitudinal side view, partially in section, of a portion of the machine.

FIGURES 4 and 5 are fragmentary sectional views, on an enlarged scale, taken substantially on lines 4—4 and 5—5, respectively, of FIGURE 3.

Referring now to FIGURE 1, there is illustrated a preferred or exemplary form of apparatus for carrying out our invention. This comprises an endless flexible belt 10, of leather or elastomeric material, entrained over a plurality of stationary rollers 11–16 journaled in a frame (not shown), some or all of which rollers may be adjustably mounted in suitable bearings to enable adjustment in the tension and disposition of the belt. Roller 11 is a driver roller and is coupled with a suitable motor and speed control unit (not shown) for driving the belt at a selected speed. The remaining rollers 12–16 are idler or guide rollers, with rollers 14 and 15 being mounted at the lead-in and lead-off ends, respectively, of a tube forming unit generally designated 17, hereinafter to be described.

Also mounted to the frame at the lead-in end of the apparatus is a spindle 18 which supports a coil or roll 19 of web material W from which the tubing is made. This web material may be an all-plastic film or a laminate of several layers of thermoplastic films and barrier films, depending, of course, on the construction of tubing which is desired to be formed. By way of illustration and not limitation, web W will be taken throughout this description as referring to a laminate of two films of thermoplastic, of like or dissimilar material, with an intermediate barrier layer of metallic foil. While forming no part of the instant invention, a laminated web of the type referred to customarily is formed by continuously extruding the two thermoplastic films onto the opposite surfaces of the intermediate foil layer. In such an operation, printing and other decorative indicia may be applied either to the foil or to either side of one of the thermoplastic films, whichever is preferred, while these films are in the flat and before bonding together into the laminate web W. Ordinarily, a larger web of several body-size widths would be made by this procedure and then slit into individual webs W and rolled into coils 19. It is envisaged that, for certain operations, it may be desirable to form the tubing from the web as it comes directly from the extrusion-lamination operation. In this case, the web W would not be rolled into coil form and, therefore, the spindle 18 could be dispensed with.

Whether supplied directly from an extrusion-lamination operation or from coil 19, the web W is fed over a guide and tensioning roller 20 and into overlying frictional engagement with belt 10. The width of the web is slightly greater than that of belt 10 so that the opposite longitudinal marginal edge portions, $w_1$ and $w_2$, extend beyond the edges of the belt. A force or pressure roller 21 directs the web firmly against the belt so that the web is fed by and at the same speed as the belt into and through the forming unit 17. The web is formed into tubular configuration and seamed in the forming unit by a seaming unit generally designated 23, in a manner next to be described, and exits from the lead-off end of the unit as a fully formed continuous tube T. The belt 10 then separates from the tube as it returns over roller 15, and the tube continues on to a cutter unit 22 which cuts into body-size lengths.

The forming unit 17 comprises an elongate horn or mandrel 24 supported in cantilever fashion to the frame of the apparatus on a heavy bracket 25 (FIGURES 2 and 3), and a forming block 26 to the top of which is fixed a guide plate 27 having a longitudinal slot 28 extending from the lead-out end for substantially its full length. The block 26 and plate 27 are interiorly contoured with a generally cylindrical surface 29 and, as a unit, provide a hollow member concentrically surrounding the mandrel 24. The diameter of surface 29 is greater than that of the mandrel an amount substantaially twice the thickness of belt 10 and web W so as to allow the frictionally engaged belt and web to enter the space therebetween. The contour of surface 29 of the forming block 26 and guide plate 27 is not truly cylindrical for a portion of their length at the lead-in end, but for reasons that will be more fully explained as this description proceeds, these members are appropriately interiorly shaped so that the web W is progressively folded about the mandrel and sized as it is fed therealong by belt 10.

Sealing unit 23 comprises an exterior endless sealing band 30, an interior endless sealing band 31, an exterior heater bar 32, an interior heater bar 33 carried by mandrel 24 (FIGURE 5), both preferably electrically heated, and a cooling unit 34, all operably arranged in longitudinal order along the forming unit 17 to press and fuse the overlapped longitudinal marginal edge portions $w_1$ and $w_2$ of web W together into a continuous lap seam S and cool the seam to a permanent set.

Exterior band 30 is entrained over a pair of rollers 35, 36, one of which is driven and the other an idler roller. The rollers and exterior band are so arranged that the lower race of the band passes into and operates within slot 28 provided in plate 27. The exterior band preferably is of thin flexible steel having its exterior surface coated with a layer of non-adherent material, such as "Teflon," to prevent sticking to the heated edges $w_1$ and $w_2$ as the seam S is being pressed together and formed.

Interior band 31 operates interiorly of the tube being formed and, accordingly, is arranged to move in close conformity with the exterior surface of mandrel 24. At the lead-in end of the forming unit, the interior band is entrained over a tension roller 37 and a pair of idler rollers 38, 39. At the lead-out end, interior band 31 makes a sharp turn around a roller 40 (FIGURE 2) mounted in the free end of mandrel 24.

The upper race of the interior band runs within a shallow longitudinal groove 41 formed within the upper surface of interior heater bar 33 embedded in mandrel 24 (FIGURE 5). Groove 41 continues rearwardly beyond heater bar 33 to roller 40 at the free end of mandrel 24 (FIGURE 2) and, therefore, is formed in the upper surface of the mandrel proper for this distance. The depth of groove 41 is such that the upper surface of the band 31 substantially coincides with the peripheral surface of the mandrel and forms therewith a smooth, uninterrupted continuation of the interior forming surface. The lower race of the interior band returns to the lead-in end of the mandrel in a longitudinal groove 42 formed in the bottom of the mandrel.

Because of the rigorous flexing which interior band 31 must sustain to enable it to operate within the confines of the mandrel and negotiate the rather sharp turn over roller 40, it preferably is constructed of an elastomeric material capable of withstanding the prolonged stressing involved while also being a fairly good heat conductor. Fiberglass has been found satisfactory for this purpose, and band 31 formed of this material also may be impregnated or coated on its exterior surface with "Teflon," like exterior band 30, to prevent sticking to the heated marginal edge portion $w_1$ and $w_2$ of the web W.

Specific reference now is made to FIGURES 2 and 3 where the several elements making up the forming unit 17 are illustrated, partly in slightly exaggerated proportions and relationships for a clearer and more specific explanation of their construction and function. Mandrel 24 is shown formed at its lead-in end, where it joins with mounting bracket 25, with a small diameter portion 24a which extends a predetermined distance rearwardly and merges with a portion 24b of larger diameter.

This latter or rearward portion of the mandrel corresponds in diameter to the inside diameter of the tube T to be formed thereon and is of this size for the remaining length of the mandrel. In other words, mandrel portion 24b corresponds in size to the ultimate size of tube T, whereas forward portion 24a is undersized with respect to the ultimate size of the final tube shape. Shown exaggerated to illustrate this construction, portion 24a actually is smaller than portion 24b in diameter by a matter of only a few thousandths of an inch, e.g. .020–.030 inch. The joinder between these mandrel portions 24a and 24b of slightly dissimilar diameter is effected by a short tapered portion 24c which, in reality, is not so nearly an abrupt joinder as the drawings here illustrated.

Forming block 26 and guide plate 27 are similarly constructed so that their interior surface 29 conforms, with slightly greater dimensions, to the different diameters of mandrel portions 24a and 24b. In addition, the forwardmost end of block 26 is interiorly countered with a tapered surface portion 29a which converges inwardly to a cylindrical surface portion 29b surrounding small diameter mandrel portion 24a. This converging surface portion of forming block 26 progressively translates each successive increment of web W, and, of course, belt 10 on which the web is frictionally carried, from a flat condition to the desired tubular configuration while simultaneously bringing the opposite longitudinal marginal edge portions $w_1$ and $w_2$ into loosely overlapped relation. As hereinbefore mentioned, the width of belt 10 is less than that of web W. Thus, although the belt 10 is made to conform to the web as both pass through the forming station, the opposite longitudinal marginal edge portions of the belt always remain spaced away from the edges $w_1$ and $w_2$ and the progressively folded web. For the remaining length of block 26 and plate 27, rearwardly of mandrel portion 24a, the surrounding surface portion 29c is of a diameter corresponding, in the same relation, to mandrel portion 24b of larger diameter.

Thus, web W and belt 10 are guided through the forming unit and, in so doing, are progressively folded into tubular configuration, first along converging surface portion 29a, then into tight conformity with small diameter mandrel portion 24a, and finally along mandrel portion 24b where the folded web is finally and accurately sized and its overlapped edges fused together. To assist in shaping the web and bringing it to accurately sized conformity with mandrel portion 24b, a plurality of hourglass rollers 43 may be mounted at spaced intervals along forming block 26 in peripheral conformity with cylindrical surface portion 29c.

The reason for this special and novel construction of mandrle 24 is to facilitate the accurate sizing of the web W as it is progressively formed on the mandrel and, in this same connection, to ensure the accurate and proper lapping of marginal edge portions $w_1$ and $w_2$ to form seam S. This result is illustrated perhaps best in FIGURES 4 and 5. As the web W, rolled within belt 10, passes over the forward mandrel portion 24a (FIGURE 4), each increment of the web is shaped in tight sliding conformity with this portion of the mandrel and its edges $w_1$ and $w_2$ are overlapped an amount slightly in excess of that which they ultimately assume as the web proceeds along the mandrel. At approximately midway of mandrel portion 24a, both the exterior band 30 and the interior band 31 have come into engagement with the outer and inner marginal edge portions, respectively, of the web. At this point, the lower race of the exterior band and upper race of the interior band are running parallel to each other and the tension on the bands is such that the contiguous overlapped edge margins are tightly gripped together by these band races.

This slightly undersized increment of web W, fully folded into tubular shape and with its overlapped edges tightly gripped between the sealing bands, next moves onto large diameter portion 24b of the mandrel (FIGURE 5). Here, the undersized tubular increment is "expanded" or drawn out to its final size and overlapped marginal edge portions $w_1$ and $w_2$ brought into their final position for seaming. At this time, the lower race of the exterior band 30 is running in direct contact with the heated face of exterior heater bar 32, and the upper race of interior band 31 is running in groove 41 in direct contact with interior heater bar 33. Heat is transmitted from these heater bars directly through the interposed band races to the lapped edges of the web W. It is for this reason that both bands 30 and 31 are made of a material of good thermal conductivity.

Heater bars 32 and 33 are of sufficient length to enable the overlapped edges to be brought to fusion temperature during the time interval that the edges for each incremental length of the web, moving at a predetermined linear speed, are present between the bars. The bars are appropriately spaced apart from each other an amount just sufficient to accommodate the combined thickness of the overlapped marginal edge portions $w_1$ and $w_2$ and the two races of the sealing bands. As such, the bars actually exert pressure against the bands so that the overlapped marginal edge portions are tightly pressed together as they fuse.

The now fused marginal edge portions, still tightly gripped between sealing bands 30 and 31, continue on along mandrel 24 to a cooling zone. This cooling zone is maintained by cooling unit 34 which is disposed rearwardly of heater bar 32 and in longitudinal engagement with the lower race of band 30 in substantially the same relationship with the band and lapped marginal edge portions $w_1$ and $w_2$ as is the heater bar 32 with the preceding increment. Cooling unit 34 is provided with suitable internal passages (not shown), through which a suitable refrigerant is circulated via an inlet conduit 44 and outlet conduit 45.

In addition to cooling unit 34, the rearward end of mandrel 24 for a length coextensive with the length of unit 34, is also internally chilled to facilitate cooling and setting of seam S. Internal cooling passages may be formed in the mandrel proper or an insert bar with suitable passages may be set in a groove cut in the mandrel surface much in the same manner as interior heater bar 33. Whichever the case, these passages are disposed close to the mandrel surface in longitudinal parallel relation with the upper race of interior sealing band 31, and are connected with an inlet passage 46 and an outlet passage 47 extending from the lead-in end of the mandrel and which connect with a suitable supply of refrigerant. Heat is extracted from the fused seam S through the lower race of exterior band 30 and the upper race of interior band 31 by the chilled contacting surfaces of the mandrel and cooling unit 34.

The tube T then emerges from the lead-out end of the forming and sealing units with seam S solidified in a permanent state. Forming belt 10 separates from the now finished tube and begins its return run around roller 15. Tube T continues onto the cutting unit 22 where it is cut into body-size lengths.

Both the exterior heater bar 32 and cooling unit 34 may be movably mounted on suitable actuating cylinders or other mechanisms (not shown) so that, during periods of shutdown or inactivity, these members may be shifted upwardly out of engagement with the lower race of band 30.

Due to the relatively close spacing between the surface of the mandrel 24 and surface 29 of the forming block 26, it may be desirable to lubricate these surfaces to facilitate the passage of the web W and the encircling belt 10 passing therethrough. It has been found particularly advantageous to maintain air films between the mandrel and the web and between the belt and the forming block to reduce the friction due to this close spacing. As illustrated in FIG. 5, a satisfactory arrangement for providing a lubricating air film on the mandrel surface is in the form of a central passage 48 running the length of the mandrel and communicating with a source of air (not shown), from which passage radiates a plurality of smaller passages 49 spaced along the mandrel and opening onto the mandrel surface. Similarly, the forming block is provided with a plurality of longitudinal passages 50 appropriately circumferentially spaced about the mandrel, and communicating with a source of air which may be the same as that which supplies air to the mandrel. From these passages 50, smaller passages 51 spaced at appropriate intervals along the length of the mandrel open onto forming surface 29. Air at relatively low pressure is emitted from passages 49 and passages 51 to provide thin lubricating films encircling the mandrel beneath web W and encircling the belt 10 to the inside of surface 29. In this manner the web and belt wound upon the mandrel pass freely through the length of the forming block 26 with a minimum of frictional resistance.

It is desirable that force roller 21 be positioned with respect to the longitudinal axis of the mandrel 24 so that undue local stressing and crowding of the web W as it takes shape around the mandrel is avoided. Because of the progressively converging pattern of the fold from the flat to tubular shape, it is apparent that the web W would tend to be stretched more along longitudinal lines closer to its edges than in its center. To avoid this, it is desirable that roller 21 be positioned so that this tendency to be stretched is equally distributed or neutralized throughout the width of the web. In one instance, satisfactory results were obtained where roller 21 was positioned so that its lower edge was in a plane passing over and tangentially to the upper surface of mandrel 24. In effect, this positioning ensures that all transverse portions in every increment of the web approach the surface of the mandrel at substantially the same angle of convergence so that the local stretching of the web as it is folded is distribtued over its width between marginal edge portion $w_1$ and $w_2$. Naturally, it is preferred to have roller 21 and lead-in roller 14 adjustable to enable the greatest possible control over the approach attitude of the web. Also, roller 21 may be shaped with a greater diameter at its center than at its ends, as illustrated in FIGURE 1, to give the web W an initial transverse bow or curvature as it approaches the mandrel.

It is thought that the invention and many of its attendant advantages will be understood from the foregoing description and it will be apparent that various changes may be made in the form, construction, and arrangement of parts of the apparatus mentioned herein and in the steps and their order of accomplishment of the method described herein, without departing from the spirit and scope of the invention or sacrificing all of its material advantages, the apparatus and method hereinbefore described being merely a preferred embodiment thereof.

We claim:

1. A method of forming a tube continuously from a web of heat fusible material, comprising the steps of continuously advancing said web in the direction of its longitudinal axis, progressively bringing the side edges of said web toward each other to form said web into tubular configuration with the marginal edge portions of said web disposed in contiguous relationship, gripping the contiguous marginal edge portions of said tubular web, passing said gripped marginal edge portions through a heating zone to fuse said marginal edge portions together, and then passing said fused marginal edge portions through a cooling zone to solidify said marginal edge portions into a permanent seam, and maintaining continuous pressure on substantial lengths of said marginal edge portions in said heating and cooling zones.

2. The method of claim 1 wherein said marginal edge portions are gripped between heat exchange surfaces which move through said heating and cooling zones at the same speed as said marginal edge portions.

3. The method of claim 1 wherein said edges are formed into a lap seam and wherein said forming step includes first forming an increment of said web to a size less than the final diameter of said tube with said marginal edge portions overlapped an excessive amount, and then expanding said increment to final size as said gripped marginal edge portions pass into said heating zone.

4. An apparatus for forming a tube continuously from a web of heat-fusible material, comprising a stationary forming mandrel, means for feeding said web longitudinally of and progressively into tubular conformity with said mandrel bringing the marginal edge portions of said web into contiguous relationship, heat exchange means moveable along said mandrel at the same speed as said web to engage a contiguous marginal edge portion of said tubular web as it moves along said mandrel, means for heating said heat exchange means as it moves along said mandrel to fuse said contiguous marginal edge portions of said web together, and cooling means for cooling said heat exchange means after the latter has been heated by said heating means to solidify said fused contiguous edge portions into a permanent longitudinal seam, said heat exchange means maintaining continuous pressure on substantial lengths of said marginal edge portions as they move past said heating and cooling means.

5. The apparatus of claim 4 wherein said mandrel has a first portion of smaller diameter than the ultimate diameter of tubes to be formed and a second succeeding portion corresponding to the diameter of the tubes to be formed, said first portion serving to permit said web to be formed thereover an excessive amount with said contiguous edge portions overlapped a width greater than the ultimate seam to be formed, and said second portion serving to expand said tubular web to desired size and accurately position said overlapped edge portions for fusing.

6. The apparatus of claim 4 wherein said heat exchange means comprises a pair of endless parallel bands, one of said bands having a race disposed slightly above the surface of said mandrel and the other of said bands having a race disposed on the surface of said mandrel in opposition to said first race.

7. The apparatus of claim 6 wherein said mandrel has a pair of diametrically opposite raceways extending for a substantial portion of its length, said raceways serving to accommodate said other band within the confines of the surface of said mandrel.

8. The apparatus of claim 4 wherein said heating means comprises a pair of heater elements, one of said elements being mounted within said mandrel and in contiguous parallel relation to one of said bands, the other of said elements being spaced from said first element and said mandrel in contiguous parallel relation to the other of said bands, said elements being appropriately spaced so as to engage said bands moving therebetween.

9 The apparatus of claim 8 wherein said cooling means comprises a pair of cooling elements, one of said elements being a portion of said mandrel having passages through which a cooling medium circulates and the other of said elements being spaced from said mandrel and positioned to engage one of said bands moving along said mandrel.

10. An apparatus for forming continuous tubing from a web of heat-fusible material, comprising a stationary forming mandrel, means for feeding said web longitudinally of said mandrel, guide means for progressively forming said web into tubular configuration around said mandrel, means for gripping and pressing together the opposite marginal edge portions of said web as said web is formed over said mandrel, means for heating and fusing said gripped marginal edge portion together into a continuous seam, said mandrel having means for directing a gaseous lubricant against the inner surface of said tubular web to reduce friction between said mandrel and said tubular web.

11. The apparatus of claim 10 wherein said gripping and pressing means comprise a pair of endless bands operable at the speed of said web, one of said bands being disposed for movement in diametrically opposite longitudinal raceways in said mandrel, and the other of said bands being spaced from and parallel to said first band and the surface of said mandrel, said pair of bands being longitudinally positioned with respect to said mandrel so as to engage said marginal edge portions therebetween at a position along said forward mandrel portion and to retain said marginal edge portions in gripped and pressed engagement over the length of said rearward mandrel portion and beyond said heating means.

References Cited

UNITED STATES PATENTS

| | | | |
|---|---|---|---|
| 2,451,728 | 10/1948 | Gardner et al. | |
| 2,660,219 | 11/1953 | Haas et al. | |
| 2,933,988 | 4/1960 | Stark. | |
| 3,257,257 | 6/1966 | Karsten et al. | |
| 3,207,651 | 9/1965 | Hood et al. | 156—466 |
| 3,042,103 | 7/1962 | McDevitt et al. | 156—466 |
| 3,007,832 | 11/1961 | Milne | 156—203 |
| 3,194,705 | 7/1965 | Caplan | 156—498 |
| 2,696,244 | 12/1954 | Jackson | 156—439 XR |
| 3,066,721 | 12/1962 | Levy | 156—200 XR |

EARL M. BERGERT, *Primary Examiner.*

H. F. EPSTEIN, *Assistant Examiner.*